(12) United States Patent
Sturm

(10) Patent No.: US 12,418,152 B2
(45) Date of Patent: Sep. 16, 2025

(54) ELECTRICAL INTERFACE DEVICE FOR AN ELECTRIC MOTOR

(71) Applicant: ebm-papst Mulfingen GmbH & Co. KG, Mulfingen (DE)

(72) Inventor: Michael Sturm, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 513 days.

(21) Appl. No.: 17/882,654

(22) Filed: Aug. 8, 2022

(65) Prior Publication Data
US 2023/0040396 A1 Feb. 9, 2023

(30) Foreign Application Priority Data
Aug. 9, 2021 (DE) .................. 10 2021 120 677.4

(51) Int. Cl.
*H01R 13/533* (2006.01)
*H01R 39/64* (2006.01)

(52) U.S. Cl.
CPC ......... *H01R 39/643* (2013.01); *H01R 13/533* (2013.01); *H01R 2201/10* (2013.01)

(58) Field of Classification Search
CPC ...... H01R 39/643; H01R 39/64; H01R 33/94; H01R 33/945; H01R 33/9452; H01R 33/533; H01R 33/46; H01R 2201/10
See application file for complete search history.

(56) References Cited

U.S. PATENT DOCUMENTS

| | | | |
|---|---|---|---|
| 7,517,257 B2* | 4/2009 | Handwerker | H02K 5/225 439/221 |
| 7,939,978 B2* | 5/2011 | Best | H02K 11/33 310/71 |
| 8,299,662 B2* | 10/2012 | Schmidt | H02K 9/14 310/71 |
| 10,306,792 B2* | 5/2019 | Sturm | H02K 5/225 |
| D881,128 S * | 4/2020 | Fries | D13/122 |
| 11,973,402 B2* | 4/2024 | Kalb | H02K 3/522 |
| 12,018,744 B2* | 6/2024 | Achinger | G08B 5/36 |
| 2017/0135238 A1* | 5/2017 | Sturm | H05K 5/0017 |

FOREIGN PATENT DOCUMENTS

| | | |
|---|---|---|
| DE | 202007019072 U1 | 5/2010 |
| DE | 102015119002 A1 | 5/2017 |
| DE | 102019005171 A1 | 1/2021 |

* cited by examiner

*Primary Examiner* — Harshad C Patel
(74) *Attorney, Agent, or Firm* — Dickinson Wright PLLC

(57) ABSTRACT

An electronics unit and a plug-in junction box for plug-in connection of a plug-in connector integrated therein in the plug-in direction (S) into a plug-compatible socket of an electronics housing of an electronics unit of an electric motor. The junction box has a housing with a pot-like accommodation region delimited by housing walls for accommodating a contact carrier of the plug-in connector. A plurality of hollow-cylindrical screw bushings extending in the plug-in direction (S) are provided in the accommodation region. At a plurality of positions corresponding to those positions of the screw bushings, the contact carrier has externally located guide elements at which the contact carrier can be guided into its final assembly position, and in the final assembly position, the respective guide elements at least partially engage around the cylindrical screw bushings.

14 Claims, 4 Drawing Sheets

ELECTRICAL INTERFACE DEVICE FOR AN ELECTRIC MOTOR

CROSS REFERENCE TO RELATED APPLICATIONS

This application claims the benefit of priority under 35 U.S.C. § 119 to German Patent Application No.: 10 2021 120 677.4 filed Aug. 9, 2021, the contents of which is incorporated herein by reference in its entirety.

FIELD

The invention relates to an electrical interface device for an electric motor, which in particular enables a connection for the modular connection of a customer interface with a motor.

BACKGROUND

The statements in this section merely provide background information related to the present disclosure and several definitions for terms used in the present disclosure and may not constitute prior art.

Conventional motor connection devices have an intermediate carrier as a terminal box which carries connection contacts for the external connection lines, as well as contact elements for the connection to the control electronics. The intermediate carrier, in the region of contact feed-through openings of the wall of the electronics housing, has in some cases a plurality of seals for sealingly engaging on the wall of the electronics housing. Such a terminal box is fitted, for example, with flat connectors and is inserted into a terminal box receptacle formed in the housing. Thus, for design-related reasons, there are several sealing and contact areas (electronic contact points) that are disadvantageously present in different sealing levels or planes in the axial direction.

Motor connection interfaces are not always designed as terminal boxes, but in some cases as plug-in solutions, so that the user or customer can establish a detachable connection with the motor using his application-specific motor connection cable. However, in addition to the wide range of variants, there is also the additional requirement for IP protection, which makes the use of plug-in solutions more difficult. The IP protection class, which has been internationally standardized for decades, specifies the suitability of electrical equipment for various defined environmental conditions to ensure the protection of persons against potential danger from electric shock during the use of the electrical equipment.

In many electrical applications, electrical and electronics equipment must function safely and reliably under severe environmental conditions for many years. In addition to the permissible temperature range, the corrosive stress, which is understood to mean resistance to aggressive media in industry such as moisture, water, vapors, acids, alkalis, oil or fuels, represents a restriction regarding usage.

The IEC/EN 60529 standard defines the IP protection classes. Two digits are added to the letters IP which are always present in the protection class designation. These digits indicate the scope of protection that is provided by an enclosure with regard to contact or foreign bodies (first digit) and moisture or water (second digit).

The international standard EN 60034-Part 5 or the concordance VDE 0530-5 applies to the classification of the degrees of protection of rotating electrical machines by an enclosure. It specifies the requirements for enclosures which are suitable for their intended use in all other respects and which, with regard to materials and workmanship, ensure that the properties specified in this standard are maintained when used as intended.

In DE 10 2015 11 9002 A1, a connection solution is described as to how a connection to an electric motor can be implemented. From DE 10 2019 005 171 A1, an electric motor is shown, which is in particular an external rotor motor comprising a rotor, a stator, an electronics housing and at least one accommodation space. The electronics housing has an installation space for electrical/electronic components which are arranged at least partially on at least one printed circuit board. The accommodation space is separated from the installation space and accommodates a plug-in connector unit in which at least one connection line is conductively connected to plug connection elements or like means. The plug-in connector unit and the electronics housing together form a common connection housing which is sealed off from the environment.

However, it is desirable to avoid a number of known disadvantages and, in particular, to allow a high degree of flexibility in the various applications and motor designs. Furthermore, there is a need to be able to continue to use an already existing electronics housing and the corresponding interface, and not to require a completely new design and corresponding tools. Thus, there is a need for a modular principle, namely for a control unit and several modules in the customer connection area which can be connected via the same interface. Furthermore, a cost-optimized solution should be aimed for. For example, a plug-in solution can also eliminate the need for a separate terminal box cover and reduce the total number of components required. This has not only economic advantages but also qualitative ones, because the fewer components, the fewer errors can occur.

SUMMARY

The present disclosure relates to a plug-in junction box for plug-in connection of a plug-in connector integrated therein in the plug-in direction (S) into a plug-compatible socket of an electronics housing of an electronics unit of an electric motor. The junction box has a housing with a pot-like accommodation region delimited by housing walls for accommodating a contact carrier of the plug-in connector. A plurality of hollow-cylindrical screw bushings extending in the plug-in direction (S) are provided in the accommodation region. At a plurality of positions corresponding to those positions of the screw bushings, the contact carrier has externally located guide elements or like means at which the contact carrier can be guided into its final assembly position. In the final assembly position, the respective guide elements at least partially engage around the cylindrical screw bushings.

An objective of the present disclosure is therefore to overcome the aforementioned disadvantages and to provide an improved and, in particular, component-optimized solution for an electronic unit with a preferably sealed interface or an electric motor with such a plug connection.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawing, in which.

Figure 1:
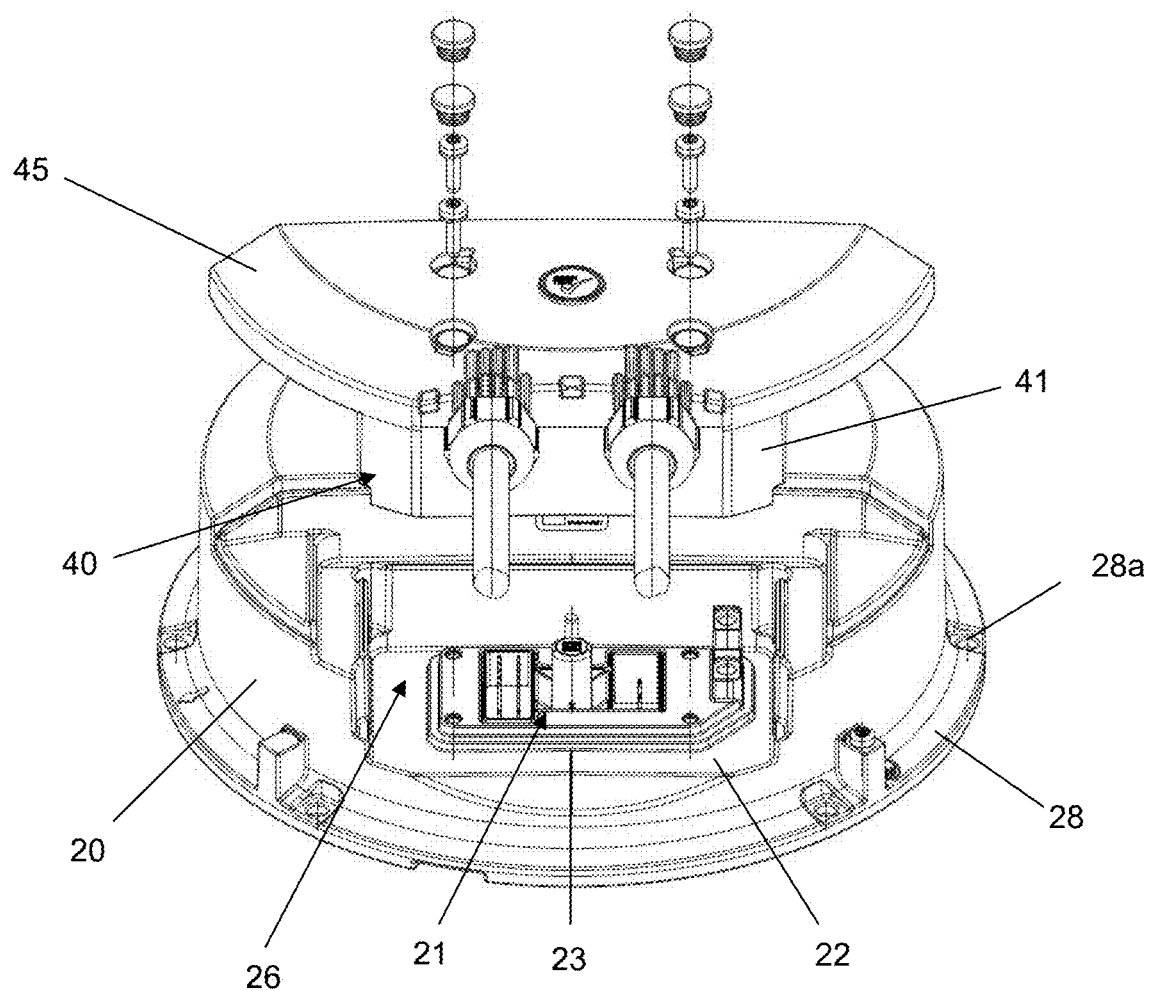
FIG. 1 is an isometric exploded view of one embodiment of an electronics unit according to the teachings of the present disclosure.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or similar parts and structural and/or functional features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According to one aspect of the present disclosure, the objective is achieved by a plug-in junction box for detachably connecting a plug-in connector integrated therein in the plug-in direction (S) into a plug-compatible socket of an electronics housing of an electronics unit of an electric motor. The junction box has a housing with a pot-like accommodation region delimited by housing walls for accommodating a contact carrier of the plug-in connector. A plurality of cylindrical screw bushings extending in the plug-in direction (S) are provided in the accommodation region. At a plurality of positions corresponding to those positions of the screw bushings, the contact carrier has externally located guide elements or like means at which the contact carrier can be guided into its final assembly position, and in the final assembly position, the respective guide elements at least partially engage around the cylindrical screw bushings.

The guide elements not only have the task of bringing the contact carrier into its intended final assembly position after it has been assembled with a connection cable, but also serve as coding means and for fixing the position within the junction box without, however, exerting a permanent force on the plastic or an alternative material after the junction box has been fastened to the electronics housing. After final assembly of the junction box, the contact carrier is supported in a substantially stress-free manner.

In the final assembly of the junction box, when it has been plugged onto the socket on an electronics housing, suitable screws can be inserted through the hollow-cylindrical screw bushings extending in the plug-in direction (S) and the junction box can be screwed together with the electronics housing. In this condition, additional seals or sealing planes are also effective between the mating plug-in parts. Advantageously, however, the socket on the electronics housing can also be designed in such a manner that the desired IP protection is ensured even in the unplugged condition.

Advantageously, it is further provided that the pot-like accommodation region for accommodating the contact carrier is closed off on one side by a cover integrally connected thereto.

In a likewise advantageous aspect of the present disclosure, one or more cable glands are provided which are integrally formed on the housing of the junction box and which are designed for a cable connection transverse to the plug-in direction (S) through the housing into the pot-like accommodation region.

According to another aspect of the present disclosure, it is advantageously further provided that in the pot-like accommodation region at least one latching recess is provided into which a latching projection of a latching tongue extending parallel to the plug-in direction engages when the contact carrier is mounted in its final assembly position in the housing of the junction box.

In a further advantageous configuration, it is provided that the respective guide elements or like means are formed as domes extending parallel to the plug-in direction (S) and having an at least partially cylindrical guide surface, preferably having a 90° section of a cylindrical body. This is then, so to speak, an outwardly open contour of an inner surface of a "partial cylinder".

It may also be advantageous if the respective guide elements are provided at corner positions, preferably the four corner positions of a substantially rectangular contact carrier.

According to yet another aspect of the present disclosure, it is further advantageously provided that a plurality of connecting ribs extend away from the housing walls of the accommodation region for accommodating the contact carrier, which connecting ribs preferably extend to at least one or more hollow-cylindrical screw bushings arranged outside the accommodation region and extending in the plug-in direction (S) and, furthermore, are preferably connected thereto. Due to the design according to the present disclosure, the connection force when connecting the junction box to the electronics housing can also be specifically shifted to regions outside the actual plug-in connection. However, it is also conceivable that the last-mentioned hollow-cylindrical screw bushings are provided only as support bushings and a screw connection to the electronics housing is made only by means of screws or connecting elements through the hollow-cylindrical screw bushings located inside the accommodation space.

In a further advantageous configuration, it is provided that the cover (in its basic form) is formed as a partial segment of a substantially circular plate and extends laterally and transversely to the plug-in direction of the plug-in connection on two sides with in each case one partial section away from the pot-like accommodation region.

A further aspect of the present disclosure relates to a corresponding electronics housing of an electronics unit of an electric motor formed with a socket in a housing-side installation space for accommodating a pluggable junction box as described above, wherein, in the plugged-in state of the plug-in connector integrated in the junction box in the socket, the junction box complements the electronics housing in its shape to form a cylindrical pot. In a correspondingly preferred configuration, the electronics housing is formed as a pot-shaped housing with a circumferential annular housing flange with the recess for the junction box being arranged as a laterally open depression in the pot-shaped housing.

Furthermore, it may be advantageous if the electronics unit for an electric motor is formed with an electronics housing in which control electronics arranged on a printed circuit board are arranged, on which an interface assembly with a socket having contacts for plugging in the plug-in connector is provided, wherein furthermore a junction box is provided whose plug-in connector is plugged in or can be plugged into the socket.

Another aspect of the present disclosure relates to an electric motor, preferably an external rotor motor, comprising an electronics unit according to the invention as previously described.

Further important characteristics and advantages of the invention are now described with associated description of the figures, with reference to the drawings. It is understood that the above-mentioned characteristics, and those to be described hereinafter, are not only applicable in the respective combination indicated, but also in other combinations, or in isolation, without departing from the scope of the present invention.

In the following paragraphs, one or more aspect of the invention are described in more detail with reference to FIGS. 1 to 4, wherein identical reference signs in the figures indicate the same functional and/or structural features.

Figure 4:
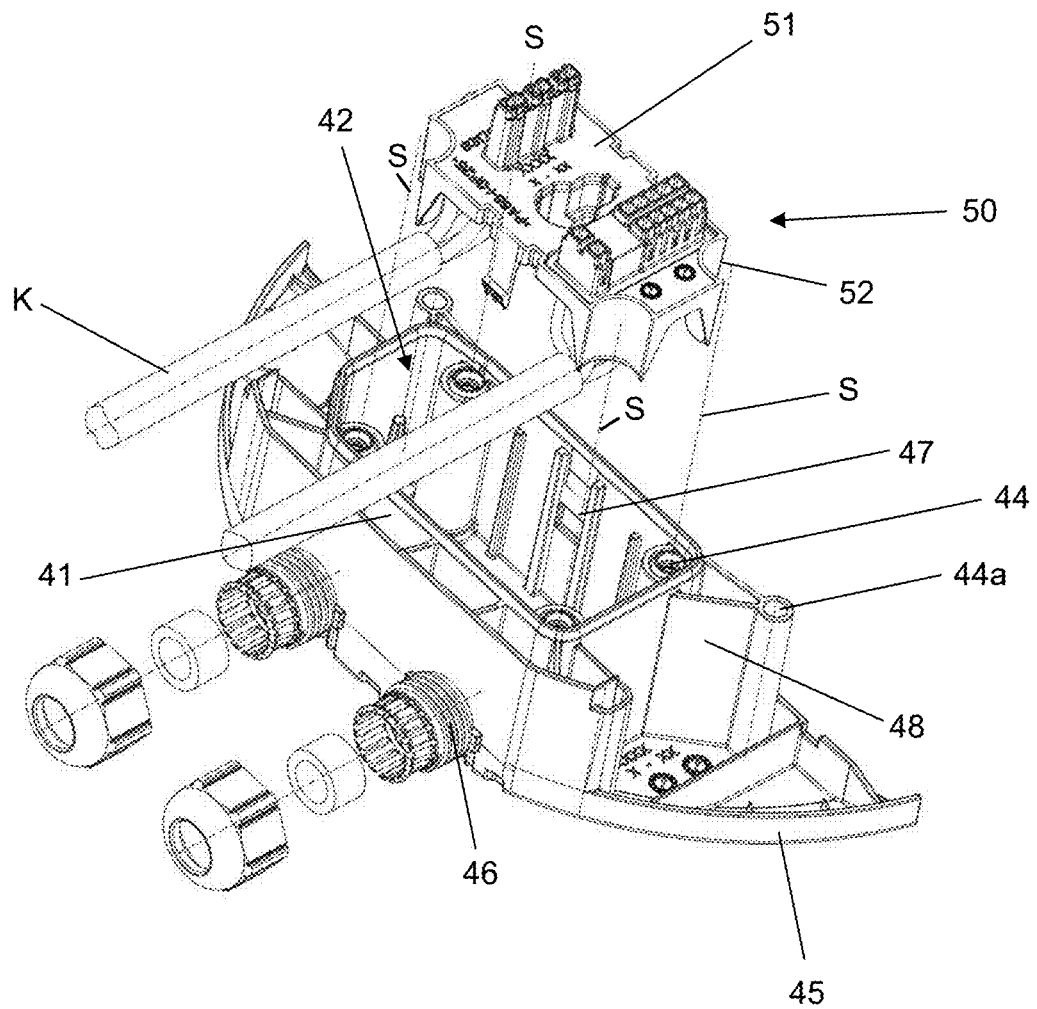
FIG. 4 is an isometric exploded view of the assemblies of the junction box according to the teachings of the present disclosure.

FIGS. 1 and 4 show isometric exploded views of an exemplary embodiment of a solution according to the invention. The electronics unit comprises a printed circuit board, which is not shown in more detail, an electronics housing 20 and a junction box 40, which are described in more detail below.

As can be seen in FIG. 1, the electronics housing 20 has a pot-like shape, wherein a housing flange 28 with mounting openings 28a is provided circumferentially on the outside. As can be further seen in FIG. 1, an accommodation space 26 is provided in the pot-shaped electronics housing 20, which accommodation space is formed as a housing recess, and as an outwardly open accommodation space 26 into which a junction box 40, described in more detail later, can be inserted and mounted. A wall 22 extending substantially parallel to the cover face is provided in the accommodation space 21. An opening 23 is provided in the wall 22 through which the interface assembly, which is mounted on the printed circuit board not shown in greater detail, is accessible. In the region of the accommodation space 26 there is the housing-side socket 21 (with exemplary contact cavities KK for suitable contact elements), which is formed to be plug-compatible with the corresponding plug-in connector 50 of the junction box 40.

Figure 2:
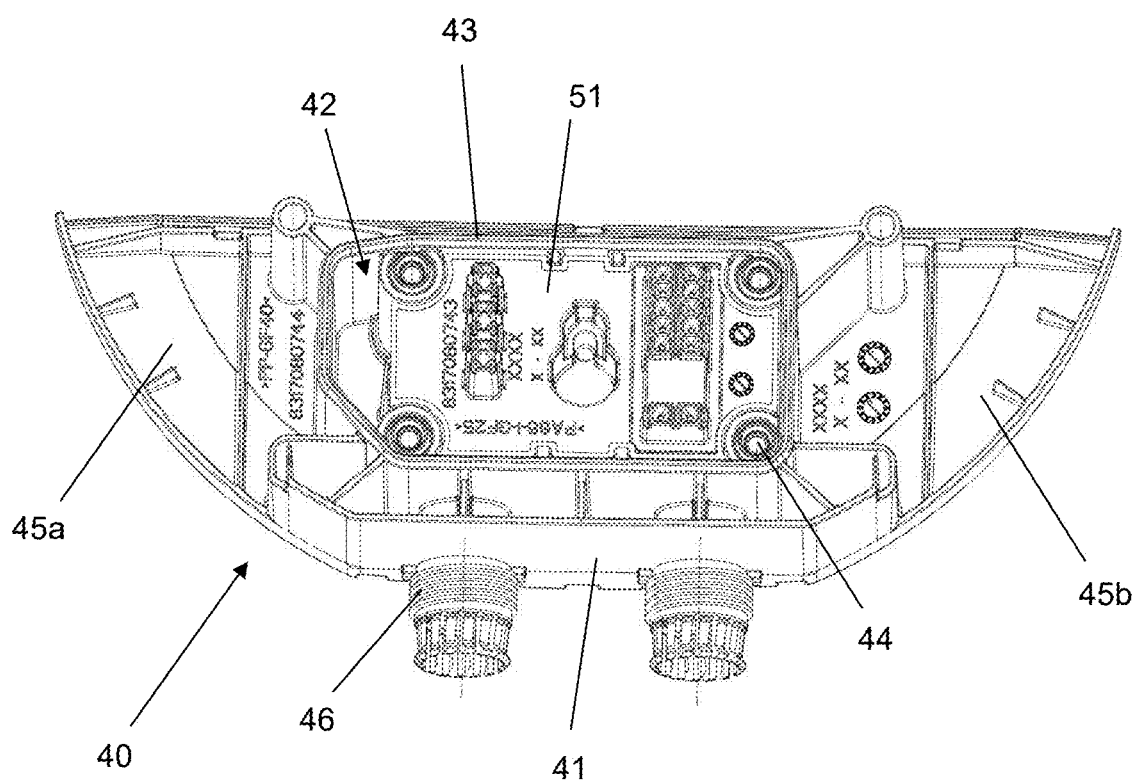
FIG. 2 is a bottom view of a junction box according to the present disclosure.

FIGS. 1, 2 and 4 show the junction box 40 in more detail. As intended, the junction box 40 has a shape formed in such a manner that it can be mounted correspondingly in the accommodation space 26 of the electronics housing 20 and can preferably be connected to the electronics housing 20 by means of fasteners and complements the shape thereof to form a cylindrical pot. For this purpose, the cover 45 of the junction box 40 is formed as a partial segment of a substantially circular plate and extends laterally and transversely to the plug-in direction (S) on two diametrically opposite sides of the cover 45 with in each case one partial section 45a, 45b away from the pot-like accommodation region 42 so as to complement the surface of the electronics housing 20.

The pluggable junction box 40, as shown in the figures, is designed for plug-in connection of a plug-in connector 50 integrated therein in the plug-in direction S into the plug-compatible socket 21 of the electronics housing 20 of an electronics unit of an electric motor. The junction box 40 has a housing 41 with a pot-like accommodation region 42 delimited by housing walls 43, as can be clearly seen in the views of FIGS. 2 and 4. This accommodation region 42 is designed for accommodating a contact carrier 51, as shown in FIG. 3.

The contact carrier 51 is a contact-carrying contact carrier 51 of the junction box 50. Four hollow-cylindrical screw bushings 44 extending in the plug-in direction S are provided here in the accommodation region 42 of the junction box 40. With screws such as those shown as an example in FIG. 1, a mechanically detachable connection to the electronics housing 20 can be made by passing the screws provided for this purpose through the hollow-cylindrical screw bushings 44 and engaging them in corresponding bushings or threaded core holes in the electronics housing in a fixing manner.

Figure 3:
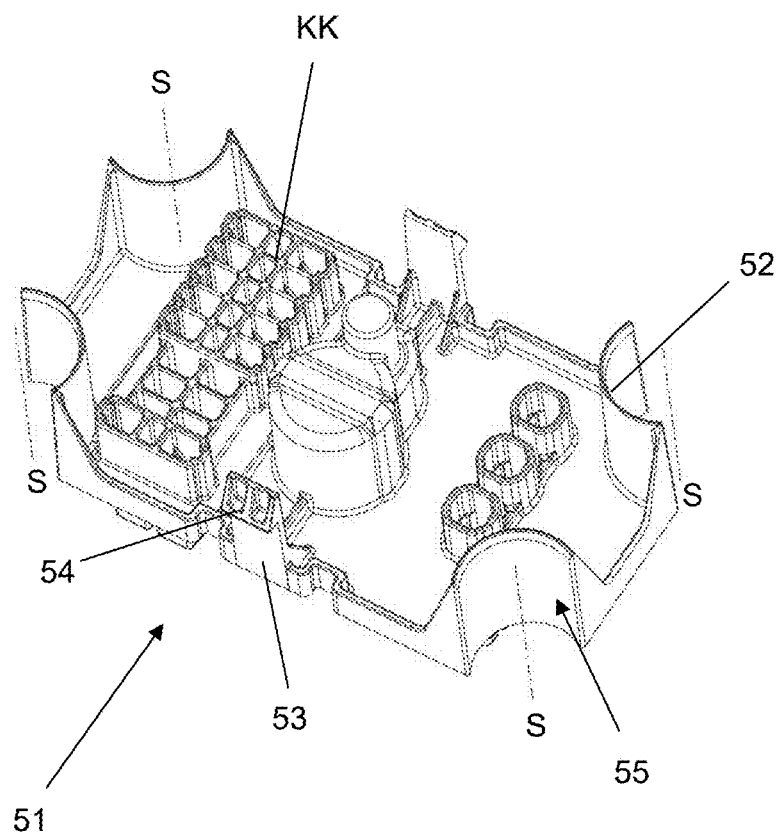
FIG. 3 is a perspective view of a contact carrier of the junction box of FIG. 2.

As can be clearly seen in FIG. 3, at each of its corner positions, the contact carrier 51 has external guide element 52 each having a curved guide surface 55. These positions correspond to the positions of the screw bushings 44 and the contact carrier 51 can be guided or actuated at these positions into its final assembly position. In this respect, the four guide elements 52 are formed as domes extending parallel to the plug-in direction S and having an at least partially cylindrical guide surface 55, namely with an internal 90° section of a cylindrical body. However, the angle can also be configured to be larger or smaller than the selected angle in the shown exemplary embodiment.

In the final assembly position of the contact carrier 51, the respective guide elements 52 at least partially engage around the cylindrical screw bushings 44, as is clearly shown in the top view of FIG. 2, where the contact carrier 51 is in its final assembly position.

The pot-like accommodation region 42 for receiving the contact carrier 51 is closed off at an upper side by a cover 45 integrally connected to the housing of the junction box 40. It is also readily apparent in FIG. 4 that two cable glands 46 integrally formed on the housing 41 of the junction box 40 are provided, which cable glands are configured for a cable connection with cable K transverse to the plug-in direction S through the housing 41 into the pot-like accommodation region 42. Preferably, these cable glands 46 (without the union nuts) are injection-molded directly onto the housing 41.

Two latching recesses 47 are provided diametrically opposite each other in the pot-like accommodation region 42, into each of which a latching projection 54 of a latching tongue 53 extending parallel to the plug-in direction (S) latches when the contact carrier 51 is mounted in its final assembly position in the housing 41 of the junction box 40.

A plurality of connecting ribs 48 extend away from the housing walls 43 of the accommodation region 42 and end in hollow-cylindrical domes 44a.

With the aid of the figures, it is further apparent that by means of the present invention, an advantageous joining process and an assembly-friendly connection option for the electronics unit are provided. Furthermore, due to the special interface design of the interface assembly, a broad scalability of the contact assignment is possible and, in particular, application-specific arrangements of signal and power contacts and, accordingly, specific interface configurations can be implemented with the junction box shown.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. Thus, the invention is not limited in its execution to the abovementioned preferred exemplary embodiments. Rather, a number of variants are conceivable that make use of the illustrated solution even in the form of fundamentally different embodiments. All such modifications and variations are within the scope of the invention as determined by the appended claims when interpreted in accordance with the breadth to which they are fairly, legally, and equitably entitled.

The invention claimed is:

1. A plug-in junction box for plug-in connection of a plug-in connector integrated therein in the plug-in direction (S) into a plug-compatible socket of an electronics housing of an electronics unit of an electric motor, wherein the junction box has a housing with a pot-like accommodation region delimited by housing walls for accommodating a contact carrier of the plug-in connector,
   wherein a plurality of hollow-cylindrical screw bushings extending in the plug-in direction(S) are provided in the accommodation region and
   wherein, at a plurality of positions corresponding to those positions of the screw bushings, the contact carrier has externally located guide elements at which the contact carrier can be guided into its final assembly position, and in the final assembly position, the guide elements at least partially engage around the cylindrical screw bushings.

2. The plug-in junction box according to claim 1, wherein the pot-like accommodation region for accommodating the contact carrier is closed off on one side by a cover integrally connected thereto.

3. The plug-in junction box according to claim 2, wherein the cover is formed as a partial segment of a substantially circular plate and extends laterally and transversely to the plug-in direction(S) on two sides with in each case one partial section away from the pot-like accommodation region.

4. The plug-in junction box according to claim 1, characterized in that one or more cable glands integrally formed on the housing of the junction box is/are provided,
   wherein the one or more cable glands is/are designed for a cable connection transverse to the plug-in direction (S) through the housing into the pot-like accommodation region.

5. The plug-in junction box according to claim 1, wherein at least one latching recess is provided in the pot-like accommodation region, into which latching recess a latching projection of a latching tongue extending parallel to the plug-in direction(S) latches when the contact carrier is mounted in its final assembly position in the housing of the junction box.

6. The plug-in junction box according to claim 1, wherein the respective guide elements are designed as domes extending parallel to the plug-in direction(S) and having an at least partially cylindrical guide surface.

7. The plug-in junction box according to claim 6, wherein the at least partially cylindrical guide surface includes an internal 90° section of a cylindrical body.

8. The plug-in junction box according to claim 1, wherein the guide elements are provided at corner positions, preferably the four corner positions of a substantially rectangularly formed contact carrier.

9. The plug-in junction box according to claim 1, wherein a plurality of connecting ribs extend away from the housing walls of the accommodation region for accommodating the contact carrier.

10. The plug-in junction box according to claim 9, wherein the plurality of connecting ribs extend to at least one or more cylindrical screw bushings arranged outside the accommodation region, thereby, extending in the plug-in direction(S).

11. The plug-in junction box according to claim 10, wherein the plurality of connecting ribs are connected to the screw bushings.

12. An electronics housing of an electronics unit of an electric motor formed with a socket in an installation space for accommodating the plug-in junction box according to claim 1, wherein in the plugged-in state of the integrated plug-in connector in the socket, the junction box complements the electronics housing in its shape to form a cylindrical pot.

13. An electronics unit for an electric motor, which is formed with an electronic housing according to claim 12, in which an electronic control system on a printed circuit board is arranged, on which an interface assembly with a socket having contacts for plugging in the plug-in connector is provided, wherein furthermore the plug-in connector of the junction box is plugged in or can be plugged into the socket.

14. An electric motor, preferably an external rotor motor with an electronics unit according to claim 13.

* * * * *